June 7, 1932. H. D. GEYER 1,861,791
OSCILLATING PIVOT JOINT
Filed June 29, 1929
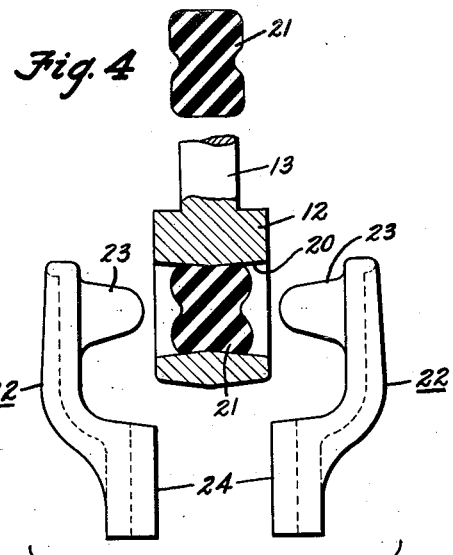
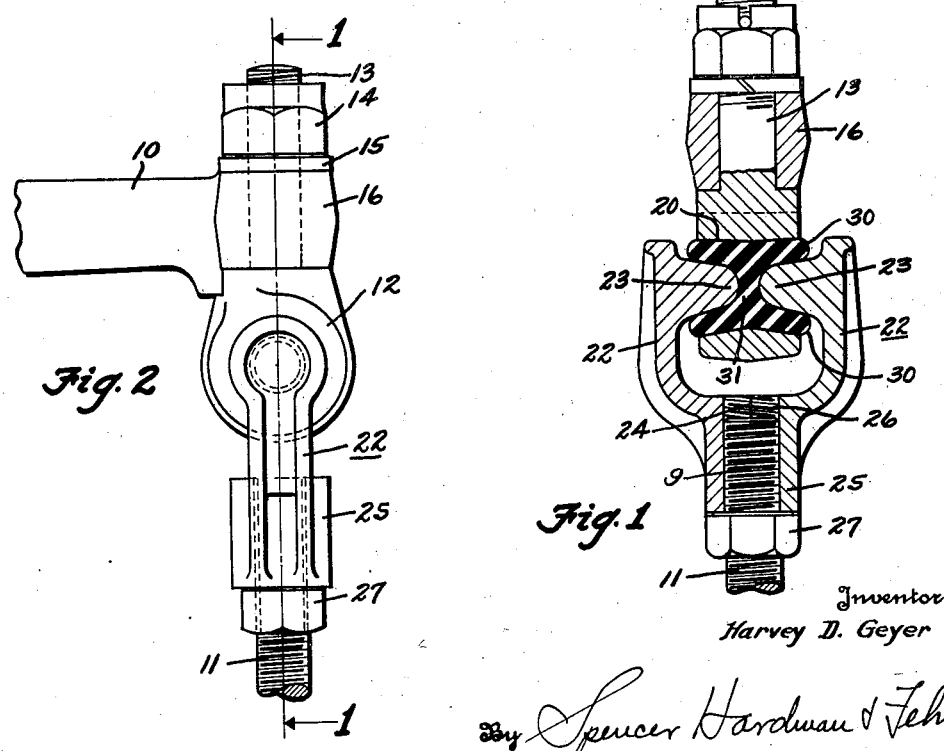
Inventor
Harvey D. Geyer
By Spencer Hardman & Fehr
His Attorneys Patented June 7, 1932

1,861,791

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

OSCILLATING PIVOT JOINT

Application filed June 29, 1929. Serial No. 374,776.

This invention relates to an oscillating pivot joint wherein the two members connected thereby are isolated from one another by a resilient non-metallic material such as soft rubber, which takes the relative pivoting between said members by internal twist therein.

An object of this invention is to provide such a joint which is efficient and long-lasting in use and which is economical to produce in quantity.

A more specific object is to provide such a joint wherein the elastic rubber, or other non-metallic material, is highly elongated in the direction of the pivot axis whereby to substantially limit additional distortion or flow of the rubber when the load upon the pivot joint increases.

A further feature is, this axial elongation of the rubber does not limit the ease with which the rubber can be given an internal twist about the pivot axis when the connected parts mutually pivot upon each other.

Another feature of this joint is the parts thereof are permanently assembled together as a unit at the time of manufacture with the rubber given the proper initial distortion, hence there can be no later tampering with or improper adjustments thereon by an unskilled mechanic.

Further objects and advantages of the present invention will be apparent from the following description, reference being had to the accompanying drawing, wherein a preferred embodiment of one form of the present invention is clearly shown.

In the drawing:

Fig. 1 is a section, taken on the line 1—1 of Fig. 2, of an oscillating pivot joint made according to this invention.

Fig. 2 is a side elevation of same.

Fig. 3 is a view showing the method of assembling the metal parts upon the rubber.

Fig. 4 shows a section through the molded elastic rubber block prior to any distortion thereof.

Similar reference characters refer to similar parts throughout the various views.

In the drawing, 10 designates the swinging lever arm which operates the pistons of a double acting hydraulic shock absorber, such for instance as is common on present day automobiles. 11 designates the thrust link which connects the lever 10 to the wheel axle by some suitable pivot joint which may be an ordinary ball and socket joint.

Lever 10 and link 11 are connected together by the oscillating pivot joint which is the subject matter of this invention.

An eye member 12 is rigidly fixed to the apertured end 16 of lever 10 by means of the shank 13, nut 14 and lock washer 15, as clearly illustrated in Fig. 2. The eye aperture 20 in eye member 12 preferably has a somewhat smaller diameter at its center than at its ends. In Figs. 1 and 3 the eye aperture 20 is shown as having a double taper. The elastic rubber block 21 is molded to the shape shown in Fig. 4, with its diameter somewhat greater than the diameter of eye aperture 20. This rubber block 21 is first forced into aperture 20 thereby giving it some axial elongation as clearly shown in Fig. 3. Next the two clevis halves 22 are brought to the position shown in Fig. 3, and then forced toward each other until the inwardly projecting slightly tapered lugs 23 are substantially embedded within the elastic rubber 21, and thereby causing a very substantial axial distortion or flow of the rubber block 21 as shown in Fig. 1. In this position of clevis halves 22 their half-cylindrical portions 24 abut one another to form a complete cylindrical portion 25 and in this position they are welded together, preferably by an electric welding process which will be understood by those skilled in the art of electric welding without detailed description of the process. During such electric welding process the upper portions of clevises 22 and the eye member 12 with the inserted rubber 21 is water-cooled to prevent such rise in temperature of the lugs 23 as will damage the elastic rubber. Such electric welding along the abutting edges 24 may be easily and rapidly done without harming the elastic rubber 21. The clevis portions 22 will then be permanently assembled together with the eye member 12 and the rubber 21 under high compression therebetween completely isolating these parts. The cylindrical portion 25 of the clevis may be easily drilled to exact size and the threads 26 tapped therein after the welding is completed. The threaded upper end 9 of link 11 is screwed into the threads 26 of the clevis 22 the desired distance and the lock nut 27 tightened to rigidly fix clevis 22 to the upper end of link 11.

In operation, the lever arm 10 and the link 11 swing or oscillate relative to each other through angles varying from a few degrees up to around 70 degrees. During such oscillation the elastic rubber 21 bears so tightly upon its contacting metal surfaces that little or no slip occurs at such surfaces and hence the pivotal movement is taken by an internal twist within the rubber itself. The rubber 21 is greatly extended axially of eye 20, causing it to bulge outwardly at the annular spaces 30. Hence any variation in the load upon the joint will not materially change the amount of outward bulging at these annular spaces 30 since the rubber fibers at and near the outer surface of the bulges are constantly under a tension, due to such initial distortion, which will highly resist any additional outward bulging at spaces 30. However the axial elongation of the rubber fibers will not cause any resistance to the torsional distortion of the rubber and hence the pivoting action will be relatively easy. The rubber block 21 cannot work out endwise from the clevis 22 since the central portion 31 thereof lies between the adjacent ends of the lugs 23.

While the form of embodiment of the present invention as herein disclosed, constitutes a preferred form, it is to be understood that other forms might be adopted, all coming within the scope of the claims which follow.

What is claimed is as follows:

1. An oscillating universal joint for connecting two relatively movable parts comprising: an eye fixed to one of said parts, an elastic non-metallic member within said eye, two inwardly projecting closed end lug members forced axially of said eye toward each other so as to embed themselves in opposite sides of said elastic member but leaving a portion thereof between said lugs and thereby cause substantial axial elongation of same, and means for fixing said lug members to the other of said connecting parts.

2. An oscillating universal joint for connecting two relatively movable parts comprising: an eye fixed to one of said parts, an elastic rubber member within said eye in non-slipping engagement therewith, two inwardly projecting closed end members forced axially toward each other so as to be substantially embedded in said rubber member but leaving a portion thereof between said opposed lugs and thereby cause substantial axial elongation of same, and means for fixing said two inwardly projecting members in said embedded position.

3. An oscillating universal joint for connecting two relatively movable parts comprising: an eye fixed to one of said parts, an elastic rubber block compressed within said eye, two oppositely disposed closed end lugs held forced axially inwardly upon said elastic block and substantially embedded therein but leaving a portion thereof filling the space between said lugs and thereby causing axial elongation of said block around the outside of said lugs, and means for fixing said lug members to the other of said connected parts.

4. An oscillating universal joint for connecting two relatively movable parts comprising: an eye fixed to one of said parts, an elastic rubber block within said eye, and side members having inwardly projecting closed end lugs held forced axially inwardly upon said rubber block and partially embedded therein but leaving a portion of said rubber block filling the space between said lugs, said side members each having exterior portions permanently fixed together whereby to retain said rubber under compression.

5. An oscillating universal joint for connecting two relatively movable parts comprising: an eye fixed to one of said parts, an elastic rubber block within said eye, and side members each having an integral inwardly projecting closed end lug held forced axially inwardly upon said rubber block and partially embedded therein but leaving a portion of said rubber block filling the space between said lugs, said side members each having exterior half-round shank portions which are welded together to form a whole shank, and means for fixing said shank to the other of said connected parts.

In testimony whereof, I hereto affix my signature.

HARVEY D. GEYER.